United States Patent
Merritt et al.

(10) Patent No.: US 12,162,606 B1
(45) Date of Patent: Dec. 10, 2024

(54) METAL PLATED PLASTIC ACM PART WITH INTERNAL THERMALLY ADAPTIVE STRUCTURE

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/464,147

(22) Filed: Sep. 8, 2023

(51) Int. Cl.
| | | |
|---|---|---|
| *F01D 11/02* | (2006.01) | |
| *B33Y 80/00* | (2015.01) | |
| *B64D 13/06* | (2006.01) | |
| *B33Y 70/10* | (2020.01) | |

(52) U.S. Cl.
CPC .............. *B64D 13/06* (2013.01); *B33Y 80/00* (2014.12); *F01D 11/025* (2013.01); *B33Y 70/10* (2020.01); *B64D 2013/0648* (2013.01); *F05D 2300/43* (2013.01)

(58) Field of Classification Search
CPC ........................ B64D 13/06; B64D 2013/0648; B33Y 70/10; B33Y 80/00; F01D 11/025; F05D 2300/43; F05D 2300/50212
See application file for complete search history.

(56) References Cited

U.S. PATENT DOCUMENTS

| | | |
|---|---|---|
| 4,327,154 A | 4/1982 | Rossmann |
| 4,939,038 A * | 7/1990 | Inabata ................... C22C 47/06 428/548 |
| 5,230,850 A | 7/1993 | Lewis |
| 6,182,929 B1 | 2/2001 | Martin et al. |
| 7,037,076 B2 | 5/2006 | Jacot et al. |
| 7,770,959 B2 | 8/2010 | Browne et al. |
| 7,854,467 B2 | 12/2010 | McKnight et al. |

(Continued)

FOREIGN PATENT DOCUMENTS

| | | |
|---|---|---|
| GB | 2472053 A | 1/2011 |
| JP | 2011148037 A | 8/2011 |

(Continued)

OTHER PUBLICATIONS

Markforged "Onyx FR-A and Carbon Fiber FR-A: Aerospace-Ready Materials", markforged.com, Jul. 26, 2021, pp. 1-6.

(Continued)

*Primary Examiner* — Sang K Kim
(74) *Attorney, Agent, or Firm* — CANTOR COLBURN LLP

(57) ABSTRACT

A component, having: a base having beads formed of with first and second thermoplastic polymers, respectively having first and second coefficients of thermal expansion (CTE), where each of the beads has an outer surface and an inner surface that abut each other; a lower support section formed on the base, having a mixture of a third thermoplastic polymer and a catalyst formed with metal; an upper support section on the component, formed on the lower support section via electrolysis deposition, a metallic coating, to thereby control thermal expansion and contraction of the component; and reinforcement fibers embedded the base, the lower support section and the upper support section.

11 Claims, 5 Drawing Sheets

(56) References Cited

U.S. PATENT DOCUMENTS

| | | | |
|---|---|---|---|
| 7,967,568 | B2 | 6/2011 | Dalton et al. |
| 8,119,206 | B2* | 2/2012 | Hougham .......... H01R 13/2414 |
| | | | 427/217 |
| 9,181,933 | B2 | 11/2015 | Daly et al. |
| 9,719,536 | B2 | 8/2017 | Ashmawi et al. |
| 9,752,442 | B2 | 9/2017 | Hayford et al. |
| 9,784,126 | B2 | 10/2017 | Army et al. |
| 9,897,078 | B2 | 2/2018 | Nicholson et al. |
| 9,919,470 | B2 | 3/2018 | Behl et al. |
| 9,981,421 | B2 | 5/2018 | Marcoe et al. |
| 10,543,897 | B2 | 1/2020 | Brown et al. |
| 10,815,976 | B2 | 10/2020 | Kaneko et al. |
| 10,976,119 | B2 | 4/2021 | Veto et al. |
| 10,982,783 | B2 | 4/2021 | Srinivasa Murthy |
| 11,008,943 | B2 | 5/2021 | Tajiri et al. |
| 11,110,647 | B2 | 9/2021 | Marcoe et al. |
| 11,167,836 | B2 | 11/2021 | Hethcock, Jr. |
| 11,192,333 | B2* | 12/2021 | Hahnlen .................. B32B 7/08 |
| 11,248,592 | B1 | 2/2022 | Tsuruta et al. |
| 11,268,520 | B2 | 3/2022 | Melo et al. |
| 11,359,287 | B2 | 6/2022 | Philibert |
| 11,668,316 | B1* | 6/2023 | Kilchyk ................. B22F 10/28 |
| | | | 416/185 |
| 2007/0140862 | A1 | 6/2007 | McMillan |
| 2008/0302024 | A1 | 12/2008 | Browne et al. |
| 2010/0028205 | A1 | 2/2010 | Ponjee et al. |
| 2016/0160353 | A1 | 6/2016 | Miarecki et al. |
| 2017/0001263 | A1 | 1/2017 | Steiner |
| 2018/0043660 | A1 | 2/2018 | Kang et al. |
| 2021/0020263 | A1* | 1/2021 | Pasini ..................... B82B 1/002 |
| 2021/0238748 | A1* | 8/2021 | Andreatta ........... C23C 18/1641 |
| 2022/0089799 | A1 | 3/2022 | Wang et al. |
| 2023/0142146 | A1 | 5/2023 | Kilchyk |

FOREIGN PATENT DOCUMENTS

| | | |
|---|---|---|
| KR | 20130005989 A | 1/2013 |
| WO | 2019108203 A1 | 6/2019 |

OTHER PUBLICATIONS

Noughabi et al., "Detailed Design and Aerodynamic Performance Analysis of a Radial-Inflow Turbine", Applied Sciences, 2018, pp. 1-21.

Pearson et al., "Novel polyurethane elastomeric composites reinforced with alumina, aramid, and poly (p-phenylene-2, 6-benzobisoxazole) short fibers, development and characterization of the thermal and dynamic mechanical properties", Composites Part B: Engineering 122 (2017): 192-201.

Zhan et al., "Metal-plastic hybrid 3D printing using catalyst-loaded filament and electroless plating", Additive Manufacturing, 2020, pp. 1-7.

Zhiguo et al., "Determination of thermal expansion coefficients for unidirectional fiber-reinforced composites", Chinese Journal of Aeronautics, 2014, pp. 1-14.

Kim, Daejong, "Parametric Studies on Static and Dynamic Performance of Air Foil Bearings with Different Top Foil Geometries and Bump Stiffness Distributions", https://doi.org/10.1115/1.2540065; Published Online: Nov. 15, 2006, 9 pages.

Lim, Teik-Cheng "Metamaterial with sign-toggling thermal expansivity inspired by Islamic motifs in Spain", Journal of Science: Advanced Materials and Devices, vol. 7, No. 1, Mar. 2022, 6 pages.

Micalizz, et al., "Shape-memory actuators manufacturing by dual extrusion multimaterial 3d printing of conductive and non-conductive filaments", Smart Mater. Struct. 28, 2019, pp. 1-13.

Schmiedeke, et al. "Experimental Investigation of Two Switching States of an Active Foil Bearing during Start-Up", Machines 2022, Published Jun. 6, 2022, 18 pages.

Wei, et al., "An overview of laser-based multiple metallic material additive manufacturing: from macro-to micro-scales", International Journal of Extrem. Manuf. 3 (2021), pp. 1-33.

* cited by examiner

METAL PLATED PLASTIC ACM PART WITH INTERNAL THERMALLY ADAPTIVE STRUCTURE

BACKGROUND

The embodiments are directed to rotors for an air cycle machine (ACM) and more specifically to metal plated additively manufactured plastic ACM part with internal thermally adaptive structure.

Parts manufactured using exotic materials may be expensive and heavy. Parts may be additively manufactured from plastic and coated with strengthening materials. However due to different coefficients of expansion, the different materials may separate or fail.

BRIEF DESCRIPTION

Disclosed is a component, having: a base having beads formed of with first and second thermoplastic polymers, respectively having first and second coefficients of thermal expansion (CTE), where each of the beads has an outer surface and an inner surface that abut each other; a lower support section formed on the base, having a mixture of a third thermoplastic polymer and a catalyst formed with metal; an upper support section on the component, formed on the lower support section via electrolysis deposition, a metallic coating, to thereby control thermal expansion and contraction of the component; and reinforcement fibers embedded the base, the lower support section and the upper support section.

In addition to one or more aspects of the component or as an alternate, the first and second CTEs differ from each other.

In addition to one or more aspects of the component or as an alternate, the beads are formed as an interconnected lattice, and wherein a void is formed in a center of each of the beads.

In addition to one or more aspects of the component or as an alternate, the fibers extend at least partially through ones of the beads, from a location adjacent to the lower support section, extending through the lower support section, and the fibers extend at least partially thorough the upper support section.

In addition to one or more aspects of the component or as an alternate, the outer surface is formed to provide a first CTE gradient; and printing the inner surface is formed to provide a second CTE gradient.

In addition to one or more aspects of the component or as an alternate, the first and second CTE gradients are opposite of each other to form a radial CTE gradient.

In addition to one or more aspects of the component or as an alternate, the first and second thermoplastic polymers are the same as each other.

In addition to one or more aspects of the component or as an alternate, the first thermoplastic polymer is Acrylonitrile butadiene styrene (ABS).

In addition to one or more aspects of the component or as an alternate, the catalyst is palladium(II) chloride ($PdCl_2$).

In addition to one or more aspects of the component or as an alternate, wherein the component is formed via stereolithography (SLA) or fused deposition modeling (FDM).

Further disclosed is an air cycle machine of an aircraft, having a component with one or more of the above disclosed aspects.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
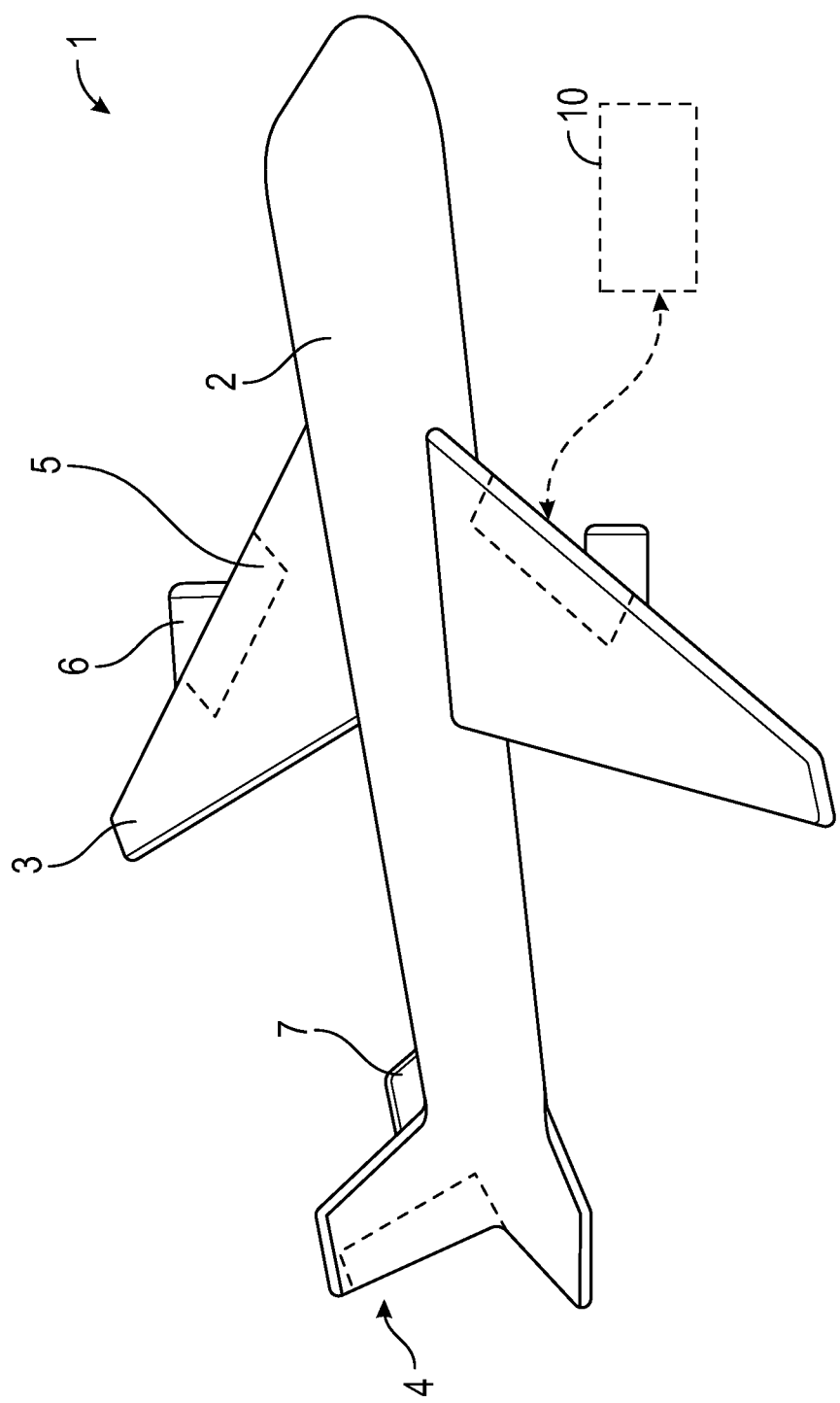
FIG. 1A shows an aircraft according to an embodiment.
Figure 1B:
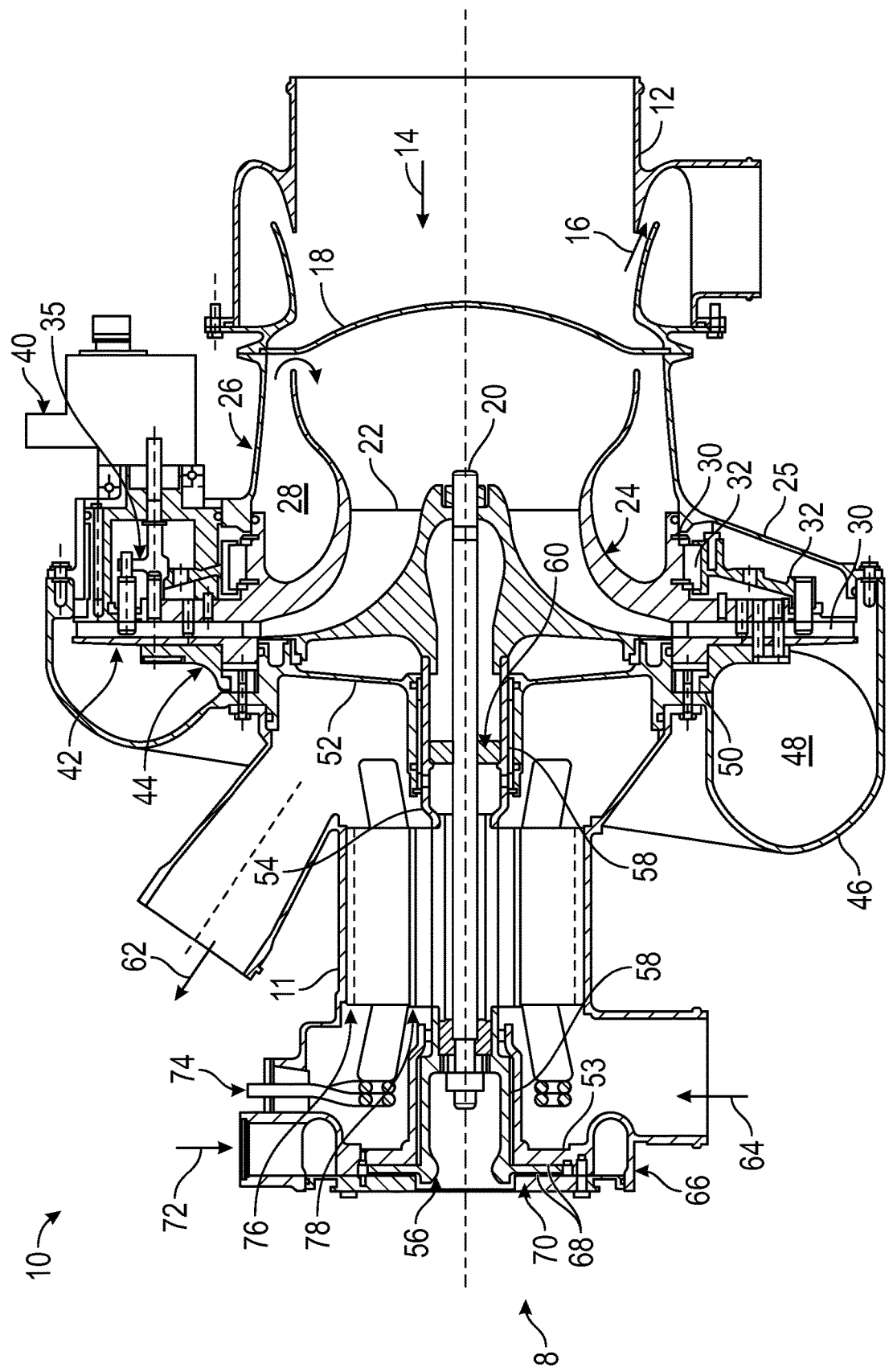
FIG. 1B shows an air cycle machine (ACM) of the aircraft according to an embodiment.

FIG. 1A shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have an air cycle machine 10. FIG. 1B shows additional details of the air cycle machine (ACM) 10. The ACM 10 may include various components or parts, generally referenced as 8. For example, an outer case 11 has an inlet housing 12 of a compressor inlet 14, and a motor cooling supply port 16. Downstream of the inlet housing 12 is a FOD screen 18. A tie rod 20 is surrounded by a compressor rotor 22. A diffusor rotor shroud (or shroud) 24 and an add heat housing 26 of the outer case 11 surround an add heat supply 28. The add heat housing 26 is connected to the outer case 11 via a forward frame member 25. Exterior to the add heat housing 26 is a backup ring 30 supporting a drive ring bearing 32. The drive ring bearing 32 is structurally coupled to a drive ring 34 and pinion 35. The ACM 10 includes a diffuser vane 36 and a variable diffusor actuator 40. Downstream of the compressor rotor 22 is an inboard plate 42 structurally coupled to a backing plate 44. An outlet housing 46 of the outer case 11 defines a compressor outlet 48. The compressor outlet 48 is secured with a bolt ring 50 to an intermediate frame member 52 of the ACM case 11. A rotor shaft 54 and aft thrust bearing shaft 56 are supported by journal bearings and a sleeve 58. The journal bearing and sleeve 58 are supported by the case 11 via, e.g., the intermediate frame member 52 and an aft frame member 53. The tie rod 20 is supported over the rotor shaft 54 by a tie rod support 60. The ACM case 11 defines a bearing and motor cooling outlet 62. A motor cooling inlet 64 is defined at an aft motor housing 66. Surrounding the thrust shaft 56 are thrust bearings 68. A thrust plate 70 is located at the aft end of the ACM 10. The aft end of the ACM 10 also defines a bearing cooling inlet 72 and includes lead wires and a cover plate 74. Between the motor cooling inlet 64 and outlet 62 is a motor stator 76 and rotor 78.

As will be discussed in greater detail below, any part 8 of the ACM 10 may be additively manufactured of different thermoplastic polymers (plastics) having different coefficients of thermal expansion (CTE), and plated in metal.

Figure 2:
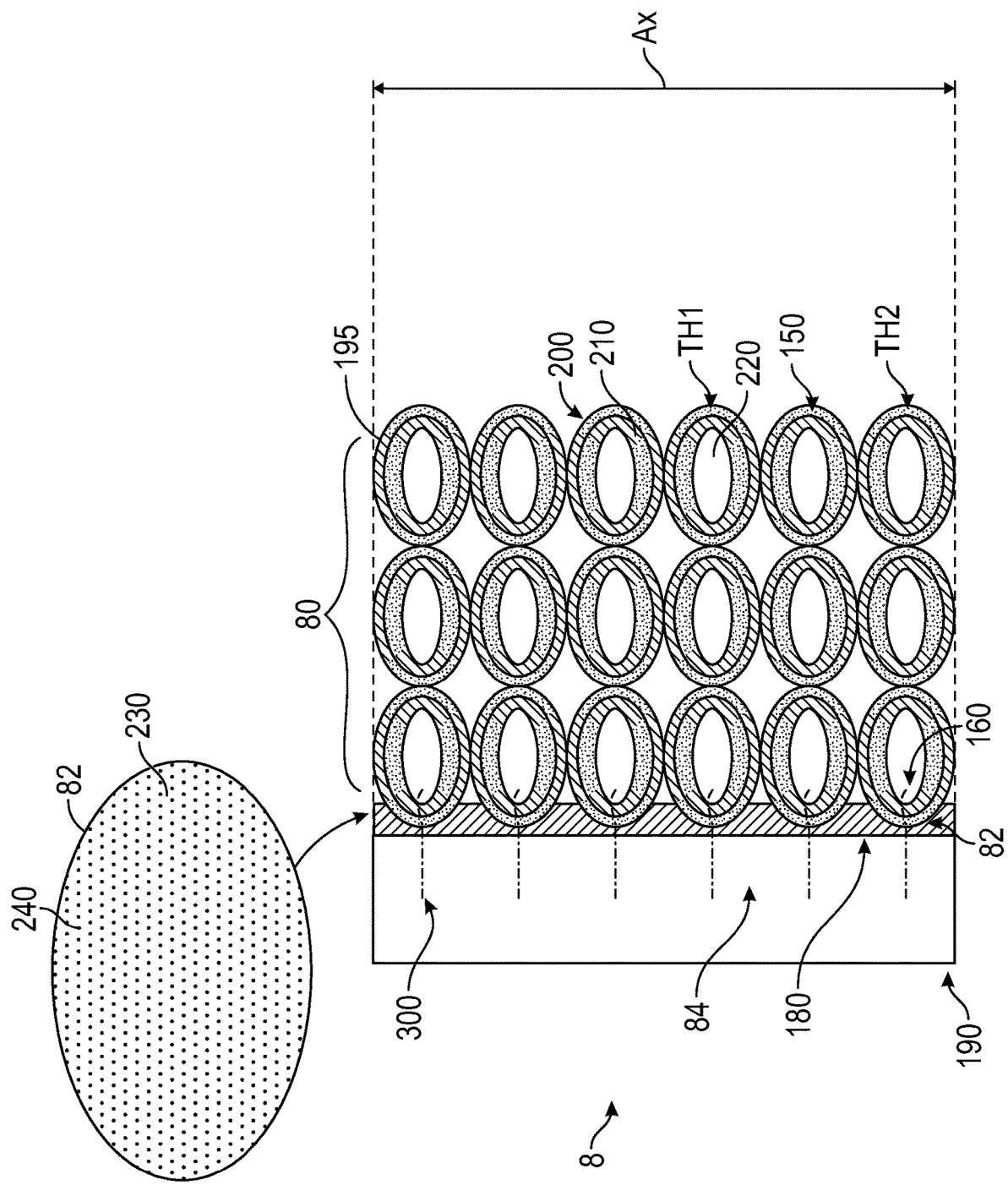
FIG. 2 shows aspects of an additively manufactured part with a lattice of beads manufactured of multiple plastic extrusions or printings to enable controlling of thermal expansion of the part.

Turning to FIG. 2, the part 8 may be additively manufactured to include a base 80 that extends from a bottom 150 of the part 8 to a first intermediate location 160 in a thickness direction. A discrete area Ax of the part 8 is shown, but the embodiments are not limited to any particular area of the part 8. A lower support section 82 is disposed over the base 80 in the thickness direction. The lower support section 82 extends from the first intermediate location 160 to a second intermediate location 180. An upper support section 84 is disposed over the lower support section 82. The upper support section 84 extends from the second intermediate location 180 to a top 190.

The part 8 may be formed by utilizing first and second thermoplastic polymers, having differing CTEs, to build up, layer by layer, beads 195 formed of first (or outer) and second (or inner) thermoplastic polymer surfaces 200, 210. A void 220 is defined within the inner surface 210 of each of the beads 195.

The lower support section 82 is a mixture of a third plastic 230 and a catalyst 240 compound that includes metal. The catalyst may be palladium(II) chloride ($PdCl_2$). The upper support section 84 is a metal plating that is formed via electrolysis deposition so that the plating may be Pd. In one embodiment, the first thermoplastic polymer surface 200 is acrylonitrile butadiene styrene (ABS). In one embodiment, the first and second thermoplastic polymer surfaces 200, 210 are the same as each other. In one embodiment, all of the utilized plastic in the part 8 can be the same thermoplastic polymer, such as ABS.

As shown in FIG. 2, the beads 195 may be formed as lattice of interconnected beads 195 that have an oval shape, though other shapes are within the scope of the disclosure. The beads 195 are micro-pattern elements. The first thermoplastic polymer surface 200 may form the outer bead surface 202 and the second thermoplastic polymer surface 210 may form the inner bead surface 212. The void 220 is located in the center of each bead 195. The outer bead surface 202 has first thickness TH1 and the inner bead surface 212 has a second thickness TH2 that is greater than the first thickness TH1.

The base 80 may include a reinforcing fibers 330 that extend at least partially through ones of the beads 195, from a location adjacent to the lower support section 82, extending through the lower support section 82, and extending at least partially thorough the upper support section 84. The fibers 300 may serve various purposes, including functioning as anchors between the layers of the base 80 and stabilizing the base 80 to prevent cracking.

Figure 3:
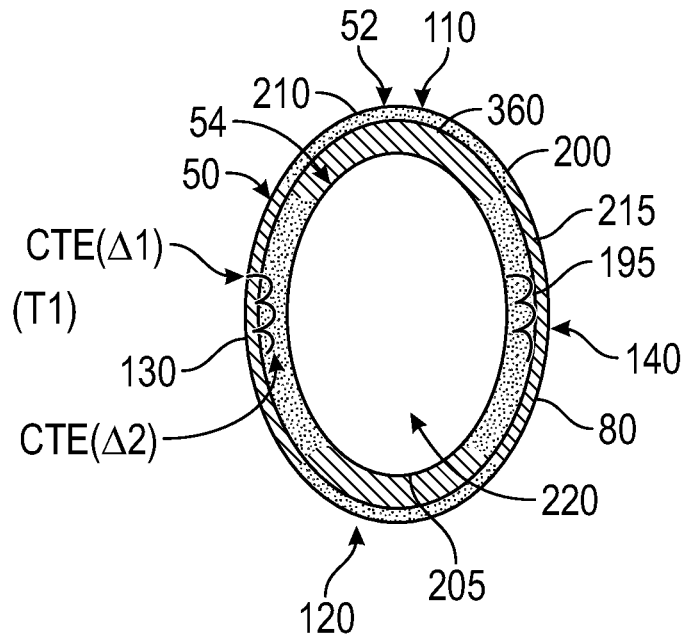
FIG. 3 shows a bead, with two thermoplastic polymer surfaces having CTE gradients that are different from each other at their interface and each one changes in the hoop or circumferential direction, at a temperature T1.

The resulting configuration is capable of controlling thermal expansion and contraction of the part 8. As shown in FIG. 3 the beads 195 may have a composition gradients across hoop-shaped walls 50, having an outer surface 52, an inner surface 54, to define first through fourth perimeter segments 110, 120, 130, 140 along the walls of the beads. The segments 110, 120, 130, 140 have different coefficients of thermal expansion (CTE) selected to provide a predetermined deformation. Each perimeter segment 110-140 may have a radial inner portion 205 (the above noted inner surface 54) and a radial outer portion 215 (the above noted outer surface 52). It is to be appreciated that the use of the term radial in this context does not require a circular cross section but rather references a distance from a center of the bead 195. The inner portion 205 of the first and second perimeter segments 110, 120 may be formed to have a first CTE and the outer portion 215 of the first and second perimeter segments 110, 120 may be formed to have a second CTE. As indicated, this may be obtained from different metals (e.g., first and second materials corresponding to first and second metals) or from plastic, fillings, or fibers. The inner portion 205 of the third and fourth perimeter segments 130, 140 may be formed to have the second CTE and the outer portion 215 of the third and fourth perimeter segments 130, 140 may be formed to have the first CTE. Locations having a same CTE may be formed of a same material. Alternatively the entire bead 195 may be formed of a single material that is formed to provide the desired CTE gradient.

Figure 4:
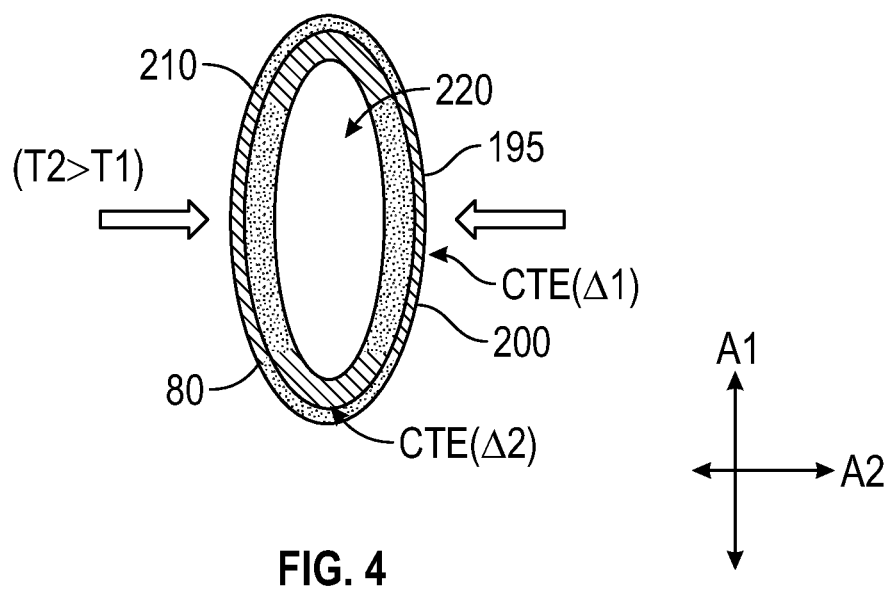
FIG. 4 shows the bead of FIG. 3 at a temperature T2>T1.

FIG. 3 shows a bead 195 is shown at temperature T1, and in FIG. 4 at temperature T2>T1, the base 80 has a controlled thermal explanation due to different CTEs and formation of the first (outer) and second (inner) thermoplastic polymer surfaces 200, 210 in the base 80. More specifically, regarding FIG. 3, the bead 195 is shown in which both the first thermoplastic polymer surface 200 and second thermoplastic polymer surface 210, i.e., the outer and inner surfaces, are also formed of CTEs that define gradients. The first thermoplastic polymer surface 200 has a first CTE gradient $CTE(\Delta 1)$ and the second thermoplastic polymer surface 210 has a second CTE gradient $CTE(\Delta 2)$. The gradients are formed such that they are different from each other at their radial interface 360 and each one changes in the hoop or circumferential direction. When the temperature is increased from T1 to T2, the resulting controlled bend of the base 80 is shown in FIG. 4. As shown, the bead 195 has an oval or elliptical shape with a long and a narrow axis A1, A2, and, at temperature T2, the bead 195 becomes compressed along its narrow axis A2 due to the controlled deformation. In FIGS. 3 and 4, the bead 195 is formed with a gradient of thermal expansion inside of the first and second thermoplastic polymer surfaces 200, 210, i.e., the outer and inner surfaces, to control the effect of the temperature changes.

It is to be appreciated that the outer surface 200 of each bead 195 may be formed with a combination of the first and second materials to provide the circumferential CTE gradient along the outer surface. For example, along the outer surface 200, polar opposite sides of the beads 195 may be formed of the first material while polar middle sides of the beads 195 may be formed of the first material. The inner surface 210 of each bead 195 also may be formed with a combination of the first and second materials that is the reverse of the outer surface 200, to provide the circumferential CTE gradient along the inner surface 210 as well as a radial CTE gradient around the bead 195.

Figure 5:
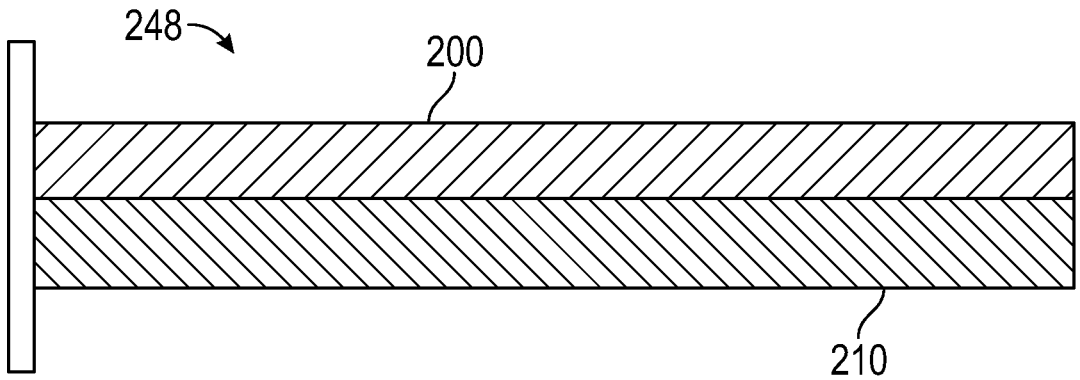
FIG. 5 shows an equivalent structure to the structures shown in FIGS. 3 and 4, with two thermoplastic polymer surfaces having different coefficients of thermal expansion (CTE), at a temperature T1.
Figure 6:
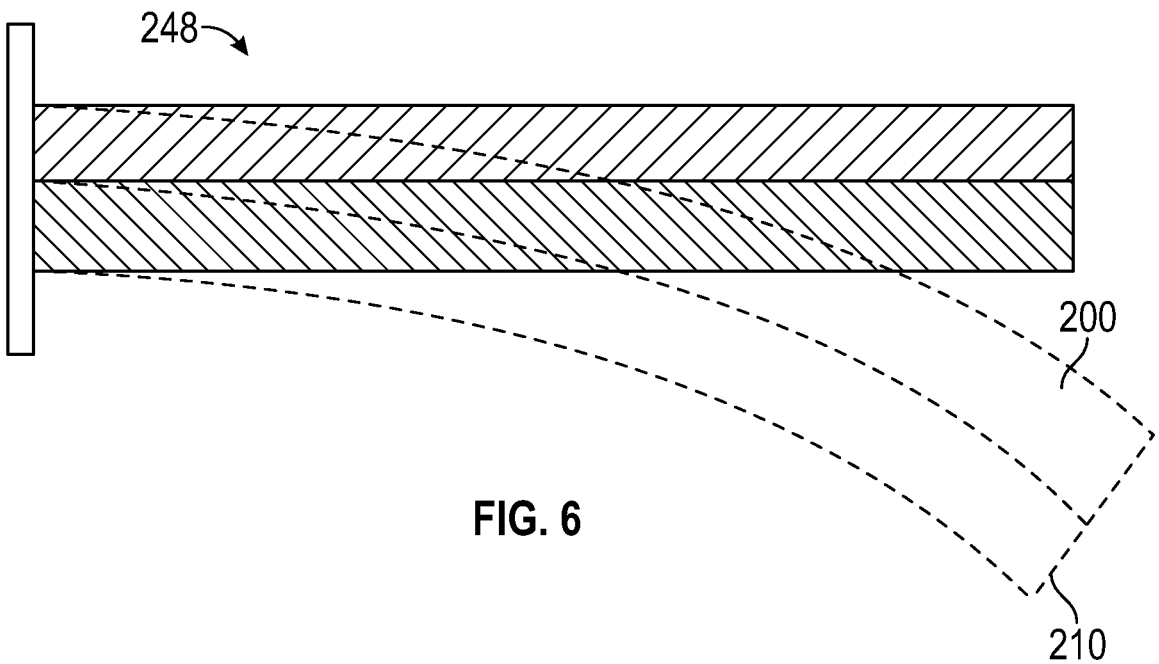
FIG. 6 shows the structure of FIG. 5 at a temperature T2>T1.

FIGS. 5 and 6 show an equivalent structure 248 to the structures shown in FIGS. 3 and 4. Specifically, the first and second thermoplastic polymer surfaces 200, 210 are at a temperature T1 in FIG. 5, and T2 that is greater than T1 in FIG. 6. The controlled thermal expansion shown in FIG. 6 results from the thermoplastic polymer surfaces being integrally connected. That is, the first and second thermoplastic polymer surfaces 200, 210 bend together in a predictable and controlled way. That is, the controlled thermal expansion of the first and second thermoplastic polymer surfaces 200, 210 in the disclose embodiments prevents the metal plating of the upper support section 84 from breaking off the part 8.

Thus, the embodiments provide a part 8 made of plastic, which results in a cost reduction compared with making the part 8 from more exotic materials. The part 8 is abrasion resistant, and is not prone to static electric charging. The part 8 is designed for optimizing thermal deflections, to reduce induced stress and weight, and increase performance. Different thermal expansion characteristics may be obtained using two different thermoplastic polymers in the additive manufacturing process. Alternatively, as discussed below, the same material may be utilized with fillings such as metallic, carbon, or Kevlar fibers in the additive manufacturing process.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component, comprising:
   a base having beads formed of with first and second thermoplastic polymers, respectively having first and second coefficients of thermal expansion (CTE), where each of the beads has an outer surface and an inner surface that abut each other;
   a lower support section formed on the base, having a mixture of a third thermoplastic polymer and a catalyst formed with metal;
   an upper support section on the component, formed on the lower support section via electrolysis deposition, a metallic coating, to thereby control thermal expansion and contraction of the component; and
   reinforcement fibers embedded the base, the lower support section and the upper support section.

2. The component of claim 1, wherein the first and second CTEs differ from each other.

3. The component of claim 1, wherein:
   the beads are formed as an interconnected lattice, and wherein a void is formed in a center of each of the beads.

4. The component of claim 1, wherein:
   the fibers extend at least partially through ones of the beads, from a location adjacent to the lower support section, extending through the lower support section, and the fibers extend at least partially thorough the upper support section.

5. The component of claim 3, wherein:
   the outer surface is formed to provide a first CTE gradient; and
   printing the inner surface is formed to provide a second CTE gradient.

6. The component of claim 5, wherein:
   the first and second CTE gradients are opposite of each other to form a radial CTE gradient.

7. The component of claim 1, wherein the first and second thermoplastic polymers are the same as each other.

8. The component of claim 1, wherein the first thermoplastic polymer is Acrylonitrile butadiene styrene (ABS).

9. The component of claim 1, wherein the catalyst is palladium(II) chloride ($PdCl_2$).

10. The component of claim 1, wherein the component is formed via stereolithography (SLA) or fused deposition modeling (FDM).

11. An air cycle machine of an aircraft, comprising the component of claim 1.

* * * * *